UNITED STATES PATENT OFFICE.

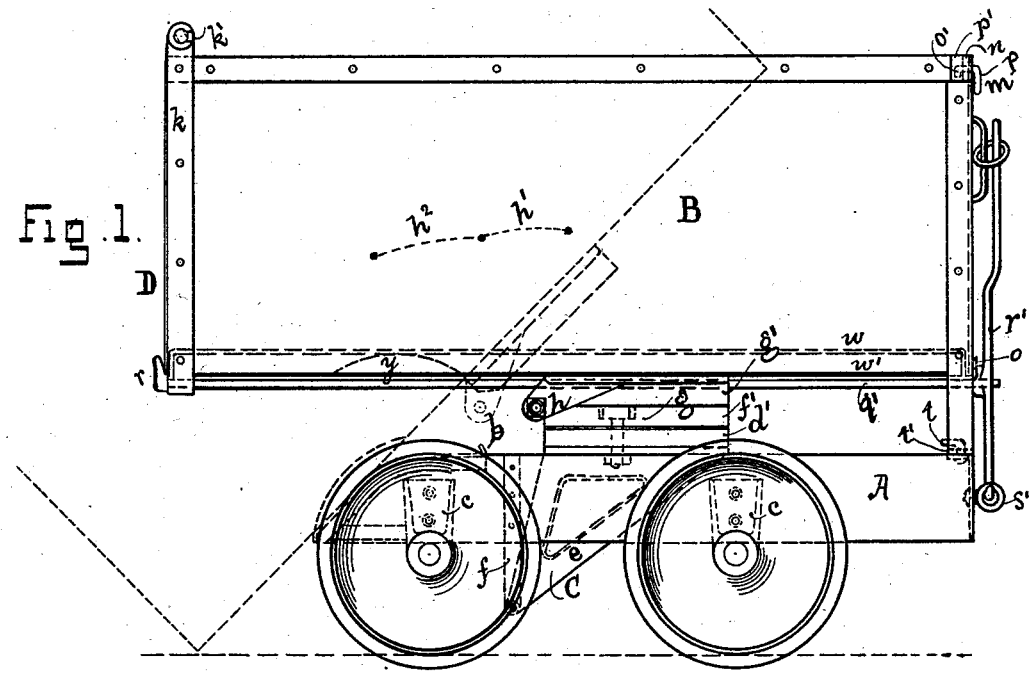

JAMES M. THOMPSON, OF SAN FRANCISCO, CALIFORNIA.

MINING-CAR.

SPECIFICATION forming part of Letters Patent No. 360,930, dated April 12, 1887.

Application filed July 31, 1886. Serial No. 209,085. (No model.)

*To all whom it may concern:*

Be it known that I, JAMES M. THOMPSON, of the city and county of San Francisco and State of California, have invented a new and useful Improvement in Mining-Cars, of which the following is a specification.

My invention relates to the class of mining-cars which are constructed so as to discharge their contents by tipping their beds.

It consists of a new construction of the car frame or "truck," by which the bed can be placed lower and tipped to discharge its load, while at the same time the weight of the load is kept equal on the axles.

It also consists in so constructing the car-bed that either one or both of its ends can be readily taken out of and replaced and secured in it, when desired, for the purposes hereinafter explained.

It also consists in making a car-bed with its rear end removable and of trapezoidal form in its cross-section, or wider across its bottom than its top, for the purpose hereinafter explained.

It also consists in providing a sheet-iron car-bed with a compound "false" or renewable bottom, which consists of an interior wooden lining on its bottom and a sheet-iron lining on the top of said wooden lining, which can be removed when worn out and replaced with a new one.

In the accompanying drawings, in which similar letters indicate like parts, Figure 1 is a longitudinal sectional view. Fig. 2 is a rear end view, and Fig. 3 is a detail view, of a portion of the removable gate and front end of the bed.

A represents the car frame or truck having the usual four-wheels and two axles, and B is the car-bed.

The entire car can be constructed of iron, with the exception of the wooden lining of the false bed-bottom, or of both wood and iron; but as some of my new devices herein shown and described are specially adapted to an iron car, the drawings show one of the special constructions of my car when made of iron.

The perpendicular sides and rear end of the truck or car frame are formed of thick sheet or "boiler" iron, and the front end of each side is beveled or cut diagonally across at an angle of about forty-five degrees and rounded at its top, as shown in Fig. 1.

The drawings show a car with round or rotating axles $a\ a$, and their boxes or bearings $a'\ a'$ are secured to or formed in the angle-pieces or "brackets" $c\ c$, which are secured to the sides of the truck.

In a car having "square" axles, which do not rotate, the boxes $a'\ a'$ are dispensed with, and the axles are bolted directly to the bottom of the brackets $c\ c$. These brackets $c\ c$ are strengthened by one or more of the ribs $c'\ c'$, which extend across the inside of the angle and between their ends, so that when they are all secured to the sides of the truck and the axles bolted directly to them, or the axle-boxes formed in or secured to them, and the axles provided with collars $d\ d$ and inserted in the boxes, the sides of the truck will be firmly secured in their upright position on and across the axles.

By the above-described construction and use of the brackets $c\ c$ the usual angle-irons extending the entire length of each of the sides of the truck are dispensed with, and the truck is made stronger and simpler in its construction, and there are no horizontal flanges for mud and débris to accumulate on.

C is a pivoted frame or tripod, the top $d'$ of which extends across and rests upon the sides of the truck at all times except when it is tipped forward toward the front or forward end of the truck, and its sides $e$ are of equal length and extend downward and forward, and are pivoted to the sides of the truck at any desired point in or below them, and on a line directly across the truck, a few inches nearer its front than its rear axle, and sufficiently forward of the front edge of the top $d'$ of the tripod to cause it, when the tripod is tipped forward on its pivot, to describe the upper part of a circle or arch, so that it will move forward horizontally, or nearly so, to a point or line nearly over the forward axle or end of the truck.

The tripod C is pivoted to the truck A by means of the bolt $e'$, which is passed through holes in the lower ends of the sides of the tripod and corresponding holes in the sides of the truck, or the lower ends of the straps $f\ f$, which are secured to and extend a short distance below the sides of the truck. These straps $f\ f$ can be bolted or secured to either the inner or the outer faces of the sides of the truck, and the sides of the tripod C can also be next either face, as may be preferred.

A revolving plate or turn-table, $f'$, is placed on the top of the tripod C, in such a position that its front edge is even with that of the top of the tripod, and is pivoted to the latter by the bolt $g$, at a point equidistant from the sides of the truck and sufficiently near its (the turntable's) front edge to cause it, when the table is rotated at a right angle, to be "in line" with and over or near enough to the side of the truck toward which it is rotated to permit of the bed B being tipped over the side of the truck to a sufficient inclination to discharge its load.

To the front edge of the turn-table $f'$ is hinged, by the hinge $h$, the corresponding edge of the plate $g'$, which is bolted or secured to and across the under side of the bottom of the bed B, on a line at a right angle across it and a little nearer to its front than its rear end, so that when the bed is filled its rear end will bear upon the top of the tripod C and the truck A. This arrangement of the relative positions of the tripod pivot or axis $e'$ and the hinge $h$ of the car-bed with respect to each other and the truck and car-bed causes the center of gravity of the load, when the bed is first tipped on its hinge $h$, to move forward sufficiently near to a perpendicular line over the pivot or axis of the tripod C to enable the "car-man" to then tip the bed on the tripod-pivot as easily as he first tipped it on the hinge $h$, when the bed is then carried on the tripod C forward sufficiently near to the forward end of the truck to allow it to be tipped on its hinge $h$ to a sufficient inclination over the end of the truck to cause its contents to be discharged when its gate D is opened.

The curved broken line $h'$ shows the movement of the center of gravity of the load when the bed is first tipped on its hinge $h$ until its bottom rests on the forward end of the truck, and the broken line $h''$ shows its movement when afterward carried forward by the tipping of the tripod, and at the same time its forward movement permits it to be tipped on its hinge $h$ to a sufficiently steeper inclination over the end of the truck to discharge its load, when the further tipping of the tripod is arrested by the stops $b\ b$ on the truck.

The gate D is pivoted in the front end of the bed B, in the usual manner, by the rod $i$, which passes through holes $i'\ i'$ in the ends of straps $k\ k$ of the bed and the straps $j\ j$ of the gate, and has the heads $x\ x$ formed on each end. To make the gate easily removable, a slot, $k'$, is cut through one edge of each of the bed-straps $k\ k$ to the hole in it, the slot being of less width than the diameter of the hole, and the rod $i$ is flattened near each of its heads, on opposite sides, to a slightly less thickness than the width of the slot $k'$ in the straps $k\ k$, and for a length slightly greater than the thickness of the straps $k$.

Sufficient space is left between the straps $k\ k$ of the bed and the straps $j\ j$ of the gate to allow the top of the sides of the bed when empty to be squeezed or forced a little in toward each other until its straps $k\ k$ are against the straps $j\ j$ of the gate D, which will then allow the rod $i$ to be pushed endwise in the holes of all the straps until one of its flattened places $l$ is opposite the slot $k'$ in one of the bed-straps $k$, when the rod $i$ can then be turned until its flattened part $l$ is in line with the slot $k'$, when the end of the rod $i$ can then be pushed sidewise out of the hole in the strap $k$, through its slot $k'$, and the other end released in the same manner and the gate D then removed.

The rear end, E, of the bed is detached from its side and bottom, and its top is secured in position by the bolts $m\ m$, which pass through holes in the strap $m'$, which is secured to the end E, and through the horizontal slots $n'\ n'$ in the hooks $n\ n$, which project inward from the sides of the bed, and its bottom by the hooks $o\ o$, which are secured to and project upward from the end of the bed bottom.

Short side projections or hooks $o',\ o'$, are formed on the inside ends of the bolts $m\ m$, and their other or outside ends are passed (while hot) through the holes in the strap $m'$, and at a distance from their hooks $o'\ o'$ equal to the thickness of the strap $m'$, and hooks $n$ are bent at a right angle, so as to form the long hooks or handles $p$, which will hang downward, and by which the bolts $m\ m$ can be turned, so that the hooks $o\ o$ on their inside ends will correspond with and can be passed through the horizontal slots $n'\ n'$, when it is desired to fasten or release the end E. The sides of the bed are held close against the end E by the hooks $p'\ p'$ on the ends of the strap $m'$.

The rear end of the bed B is even with the rear end of the truck A, and is supported on the latter by the strap or plate $q$, which is secured to its bottom.

The gate D is opened and closed, and the rear end of the bed is secured to and released from the truck by the usual devices of the rod $q'$, which extends the entire length of the bed-bottom, and is pivoted to its under side, and has the hook $r$ formed on its front end, and also has secured to its rear end the cross handle or lever $r'$, having the hook $s$ on its lower end, which passes around the pin or eye $s'$, which is secured to the rear end of the truck A.

To prevent the gate D from opening as soon as the bed is "unhooked" from the truck and keep it closed until the proper time for opening it while the bed is being tipped, and also to keep it closed when the handle $r'$ is turned to a horizontal position to permit large pieces of ore or rock to be passed into the rear end of the bed, I so form the hook $r$ on the rod $q'$ and secure its cross-arm or handle $r'$ to it in such position that when the handle $r'$ is rotated to a horizontal position the hook $r$ will still extend sufficiently upward and over the lower side of the gate D to keep it closed; also, to hold the rear end of the bed down on the truck when it is unhooked, by turning the handle $r'$ to a horizontal position to permit the loading of the car, and also to insure against the tipping of the bed (which sometimes results from the unhooking of the bed from the truck while the car is in motion) I secure in the top of the truck the upright rotating bolt $t$, having a hook formed on its upper end, which passes through the slot $t'$ in the strap $q$, and can be turned so that its hook will either project over or pass through the slot $t'$ and hold the strap down on the top of the truck or release it. I also so proportion the length of the car-bed B that when tipped its front end strikes solidly on the track-rails, by which much strain and wear of the car is avoided, and its load is more quickly discharged. This cannot be done with other cars without increasing the length of the bed more than would be desirable or practicable.

To stiffen and avoid wear of the bottom of the sheet-iron car-bed B, I provide a false or sheet-iron bottom, $w$, and the intermediate wooden bottom $w'$ between it and the main bed-bottom. The iron bottom $w$ is turned down at each of its ends, so as to form flanges, against which the gate D and removable end E can bear when in position in the bed, and both the wooden and the iron bottom $w$ are bolted to the main bed-bottom, so that when the iron bottom $w$ is worn out it can easily be replaced with a new one.

Longitudinal slots $y$ $y$ are cut out of the main and wooden bottoms of the bed, to admit the flanges of the front wheels when the bed is tipped over them to dump its load. By this means I am enabled to reduce the height of the car-bed and its load a distance equal to the width of the flanges of the car-wheels.

Cars of this construction can be provided with "brakes" the same as other cars.

My car-bed is tipped or its load discharged in a similar manner to the ordinary car, excepting that the handle $r'$ requires to be turned down a little below a horizontal line to allow the gate D to open, and the bed is first only partially tipped or rotated on its hinge $h$ until its bottom strikes the front end of the truck, and the center of gravity of the load is carried forward as near or nearer to a perpendicular line from from the pivot $e'$ of the tripod C as it was at first to a similar line from the hinge $h$ of the bed, when it is then pushed, which causes it to be carried forward by the tipping of the tripod C, and permits it at the same time to be turned on its hinge $h$ to a sufficient inclination over the end of the truck to discharge its load, and the top of the tripod strikes against the stops $b$ of the truck; also, the operation of my car is different from that of other cars when it is desired to transport timbers or large pieces of ore or rock, or when its load is required to be lifted or shoveled into it.

In cases where timbers are to be transported, instead of placing them on the top of the car-bed, as is necessary in other cars of which I have any knowledge, both the gate D and the rear end, E, of the bed B are removed, when the timbers can then be passed from the "timber-platform" (which is usually, or should be, a little above the top of the car-bed) over the side of the bed, and placed on its bottom without having to lift or move them endwise, as is necessary in other cars, and the gate D can then be replaced so that it can lie on the timbers, and its rod $i'$ can be replaced, so as to prevent the spreading of the sides of the bed by the timbers.

When large pieces of ore or rock are required to be placed in the bed, or its load is required to be lifted or shoveled into it, the rear end, E, is only removed, and the handle $r'$ turned down only to a horizontal position, so that the gate D is kept closed by the hook $r$, and the bolt $t$ in the top of the truck is turned so that its hook will extend over the strap $q$ and hold the rear end of the bed B fast to the truck, when the large pieces of ore or rock can then be lifted or rolled up on skids into the car-bed, and the greater part of its load placed in it before the end E is secured in it, and the balance of the load can then be lifted over the sides or end of the bed in the usual manner.

When it is desired to "dump" the load at the side of the truck, the bed is turned at a right angle on its turn-table $f'$, which carries the hinge $h$ of the bed sufficiently near the side of the truck to permit the bed to be tipped over it.

When it is not desired to have a car to dump its load at the side, the turn-table or plate $f'$ can be dispensed with, and the car-bed secured to the top or hinged to the front edge of the top of the tripod C.

The advantages of my improved car are as follows: The center of gravity of the load being lower than in other cars of the usual construction, and the weight equal on the axles, the car runs more steadily, so that heavier loads can be transported on the same axles and track, and a saving in the number of cars effected; also, the car can be run with greater speed, with less danger of running off or "jumping" the track, which frequently occasions damage and loss of life. The rear end of the bed being removable, and the bed also wider across its bottom than a car of rectangular form can be in a tunnel of given size, larger pieces of ore or rock can be placed in it than could be placed in a bed of rectangular form, even if its rear end was made removable, so that a car of my improved construction, having both these features combined, serves the purpose of an open truck as well as a car, and serves it better, for after large pieces of ore are placed in the bed it can then be entirely filled and a full load transported; also, by providing the car-bed with a pivoted gate in its front end and a removable end piece in its rear end, the bed has the advantages of each, which it would not have if both its ends were merely made removable, or both provided with pivoted gates, for the bed is more easily and conveniently loaded (when the load is required to be lifted into it) after entirely removing its rear end than a pivoted gate would permit; nor would a removable end piece in the front end of the bed serve the purpose of a pivoted gate, for manifest reasons; also, the front gate, as well as the rear end of the bed, being removable, timbers can be more easily loaded on the car, and longer timbers can be transported around curves, as tunnels are in almost all cases wider across their bottoms than their tops.

I am aware that car-beds have heretofore been made of trapezoidal form; but they had not the advantage above mentioned, that larger pieces of ore or rock could be placed in them than in beds of rectangular form because their rear ends were not removable. I am also aware that the Patent No. 56,480 to G. Williams is for a car-bed having a swinging or pivoted gate at both its ends; but neither of them is removable, as my gate is, and hence in many cases such a car-bed could not serve the purposes or possess the advantages of a car-bed of my construction; nor do I claim a car-bed having two gates, but having one removable gate in its front end, and having its rear end removable.

Having thus described my invention, what I claim, and desire to secure by Letters Patent, is—

1. A dumping-car having the longitudinally-tipping table or tripod C, constructed, arranged, and combined with its truck A and bed B, substantially in the manner as described, and for the purpose set forth.

2. In a dumping-car, the combination, with the truck A, of the longitudinally-tipping table or tripod C, having its pivot or axial line $e'$ forward of its front edge and pivoted to the sides of the truck on an axial line across them, and below their tops and nearer to the forward than the rear axle and having the car-bed B mounted on it, substantially as and for the purpose described.

3. The truck A of a dumping-car, having the longitudinally-tipping tripod C, supporting-straps $f\ f$, and stops $b\ b$, substantially as and for the purposes described.

4. In a dumping-car, the combination, with the truck A, having the eye or bolt $s'$, of the tipping car-bed B, having the pivoted front gate, D, and removable rear end, E, and bolt or rod $q'$, pivoted to its bottom, which has the hook $r$ and cross-handle $r'$, with its hook $s$, constructed and arranged in the described manner, to keep the gate D closed when the bed B is unhooked from the truck A and until the cross-handle $r'$ of its rod $q'$ is turned below a horizontal line through its axis, substantially as and for the purposes described.

5. In a dumping-car, the combination, with the truck A and the bed B, of the longitudinally-tipping tripod C, having its pivot or axial line forward of its front edge and across and below the top of the truck, and nearer the front than the rear axle and parallel to them, and having its top extended over and bearing on the top of the sides of the truck, substantially in the manner as and for the purposes described.

6. In a dumping-car, the combination, with the tripod C and car-bed B, of the pivoted turn-table $f'$, to the front edge of which the bottom of the bed B is hinged, substantially in the manner as and for the purpose described.

7. In a dumping-car, the combination, with the tipping car-bed B, of the pivoted gate D and removable rear end, E, substantially as and for the purposes described.

8. The car-bed B of a dumping-car, made wider across its bottom than its top and having its rear end, E, made removable, substantially as and for the purposes described.

9. In a dumping-car, the truck A, having in its rear end the pivoted bolt or hook $t$, in combination with the strap $q$ of the bed B, having in it the slot $t'$, substantially as and for the purpose described.

10. In a dumping-car, the combination, with the iron bed-bottom and false or renewable iron bottom $w$, of the intermediate wooden bottom $w'$, substantially as and for the purpose described.

11. In a dumping-car, the combination, with the bed B, having the hooks $o\ o$ in its bottom, and hooks $n\ n$, having in them the horizontal slots $n'\ n'$, of the removable end piece, E, having the strap $m'$, with its hooks $p'\ p'$, and bolts $m\ m$, with their handles $p\ p$, and hooks $o\ o$, constructed and arranged in the manner substantially as and for the purpose described.

12. In a dumping-car, the combination, with the bed B, having the straps $k\ k$, with their holes $i'\ i'$ and slots $k'\ k'$, of the removable pivoted gate D, having its straps $j\ j$, and rod $i$, with its heads $x\ x$ and flattened faces $l\ l$, substantially as and for the purpose described.

13. In a dumping-car, the combination, with the truck A, having the straps $f\ f$, stops $b\ b$, and eye or pin $s'$, of the tipping tripod C and bed B, mounted on the top of the tripod, and having the pivoted gate D and bolt or rod $q'$ pivoted to its bottom which has the hook $r$ and cross-handle $r'$, with its hook $s$, constructed and arranged in the manner substantially as and for the purpose described.

14. In a dumping-car truck having its sides formed of sheet-iron, the combination, with its sides and axles, of the four angle-pieces or brackets $c\ c$, which are secured to the sides of the truck, and to which are secured the axles or their boxes, or in which the said boxes are formed, substantially as and for the purpose described.

15. In a dumping-car, the tilting bed B, having the slots or recesses $y\ y$ in the under side of its bottom, substantially as and for the purpose described.

JAMES M. THOMPSON.

Witnesses:
D. W. C. MORGAN,
CHAS. D. WHEAT.